US008289324B1

(12) United States Patent
Laine et al.

(10) Patent No.: US 8,289,324 B1
(45) Date of Patent: Oct. 16, 2012

(54) SYSTEM, METHOD, AND COMPUTER PROGRAM PRODUCT FOR SPATIAL HIERARCHY TRAVERSAL

(75) Inventors: Samuli M. Laine, Vantaa (FI); Timo O. Aila, Tuusula (FI); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 1170 days.

(21) Appl. No.: 11/958,240

(22) Filed: Dec. 17, 2007

(51) Int. Cl.
*G06T 15/50* (2011.01)
(52) U.S. Cl. ......................................................... 345/426
(58) Field of Classification Search .................... 345/426
See application file for complete search history.

(56) References Cited

U.S. PATENT DOCUMENTS

| | | | |
|---|---|---|---|
| 5,666,298 A | 9/1997 | Peleg et al. | |
| 5,675,825 A | 10/1997 | Dreyer et al. | |
| 5,802,336 A | 9/1998 | Peleg et al. | |
| 5,933,146 A * | 8/1999 | Wrigley | 345/420 |
| 6,041,404 A | 3/2000 | Roussel et al. | |
| 6,243,803 B1 | 6/2001 | Abdallah et al. | |
| 6,247,116 B1 | 6/2001 | Abdallah et al. | |
| 6,418,529 B1 | 7/2002 | Roussel | |
| 6,651,151 B2 | 11/2003 | Palanca et al. | |
| 6,671,795 B1 | 12/2003 | Marr et al. | |
| 6,868,420 B2 * | 3/2005 | Perry et al. | 707/743 |
| 2008/0024489 A1 * | 1/2008 | Shearer | 345/421 |
| 2009/0089542 A1 | 4/2009 | Laine et al. | |
| 2009/0106530 A1 | 4/2009 | Lauterbach et al. | |
| 2009/0132878 A1 | 5/2009 | Garland et al. | |

OTHER PUBLICATIONS

Sengupta et al., "Scan Primitives for GPU Computing," Proceedings of Graphics Hardware 2007, San Diego, CA, Aug. 4-5, 2007.
Blelloch, "Prefix Sums and Their Applications," Carnegie Mellon University School of Computer Science, Technical Report CMU-CS-90-190, Nov. 1990.
U.S. Appl. No. 11/862,938, filed Sep. 27, 2007.
D. Naishlos, J. Nuzman, C-W. Tseng, and U. Vishkin, 2001. Towards a first vertical prototyping of an extremely fine-grained parallel programming approach. In *Proc. 13th ACM Symposium on Parallel Algorithms and Architecture (SPAA 01)*, Jul. 2001. http://www.umiacs.umd.edu/users/vishk/XMT/spaa01.pdf.
U.S. Appl. No. 11/942,608, filed Nov. 19, 2007.
S.-E. Yoon, P. Lindstrom, V. Pascucci, and D. Manocha. "Cache-oblivious mesh layouts." *ACM Transactions on Graphics*, Proc. SIGGRAPH 2005, 24(3), Jul. 2005.
V. Havran and J. Bittner. "Efficient sorting and searching in rendering algorithms." *Eurographics 2006 Tutorials*, Tutorial T4, Aug. 2006. http://moon.felk.cvut.cz/~havran/eg2006tut/tut4eg.06.pdf.
U.S. Appl. No. 11/938,091, filed Nov. 9, 2007.
U.S. Appl. No. 11/874,093, filed Oct. 17, 2007.
I. Kamel and C. Faloutsos. "On Packing R-trees." In *Proc. 2nd Int'l Conf. on Information & Knowledge Management*, Nov. 1993.
V. Pascucci and R. Frank. "Global Static Indexing for Real-time Exploration of Very Large Regular Grids." In *Proc. Supercomputing 2001*, Nov. 2001.

(Continued)

*Primary Examiner* — Edward Martello
(74) *Attorney, Agent, or Firm* — Zilka-Kotab, PC

(57) ABSTRACT

A system, method, and computer program product are provided for spatial hierarchy traversal. In operation, a spatial hierarchy is traversed for ray tracing. Additionally, a number of nodes traversed in each of a plurality of levels of the spatial hierarchy is stored.

21 Claims, 7 Drawing Sheets

OTHER PUBLICATIONS

C. Wächter and A. Keller. "Instant Ray Tracing: The Bounding Interval Hierarchy." In *Proc. Eurographics Symposium on Rendering Techniques*, Apr. 2006.

U.S. Appl. No. 11/927,099, filed Oct. 29, 2007.
U.S. Appl. No. 11/940,782, filed Nov. 15, 2007.
U.S. Appl. No. 11/950,193, filed Dec. 4, 2007.
U.S. Appl. No. 11/958,259, filed Dec. 17, 2007.
U.S. Appl. No. 11/956,108, filed Dec. 13, 2007.
U.S. Appl. No. 11/956,060, filed Dec. 13, 2007.
U.S. Appl. No. 11/956,137, filed Dec. 13, 2007.

Blelloch, G. E., Vector Models for Data-Parallel Computing, The MIT Press, 1990, USA and England (264 pages).

Thinking Machines Corporation, Connection Machine Model CM-2 Technical Summary, Version 6.0, Nov. 1990, USA (118 pages).

Wald, I. Realtime Ray Tracing and Interactive Global Illumination, Dissertation Thesis, Jan. 21, 2004, Germany (311 pages).

Gunther, J. et al., Realtime Ray Tracing on GPU with BVH-based Packet Traversal, to appear in the IEEE/Eurographics Symposium on Interactive Ray Tracing 2007, IEEE Computer Society, 2007, Washington D.C., pp. 113-118 (6 pages).

Horn, D. R. et al., Interactive k-D Tree GPU Raytracing, Proceedings of the 2007 symposium on Interactive 3D graphics and games, ACM, 2007, USA, pp. 167-174 (8 pages).

Popov, S. et al. Stackless KD-Tree Traversal for High Performance GPU Ray Tracing, Eurographics 2007, Eurographics Association and Blackwell Publishing, vol. 26, No. 3, Oct. 12, 2007, UK and USA, pp. 415-424 (10 pages).

Harris, M., Parallel Prefix Sum (Scan) with CUDA, nVIDIA Corporation, Apr. 2007 (21 pages).

Havran, V., Heuristic Ray Shooting Algorithms, Dissertation Thesis, Nov. 2000, Prague (220 pages).

Aila et al., U.S. Appl. No. 12/780,963, filed May 17, 2010.
Aila et al., U.S. Appl. No. 12/780,964, filed May 17, 2010.
Aila et al., U.S. Appl. No. 12/780,965, filed May 17, 2010.

* cited by examiner

SYSTEM, METHOD, AND COMPUTER PROGRAM PRODUCT FOR SPATIAL HIERARCHY TRAVERSAL

FIELD OF THE INVENTION

The present invention relates to ray tracing, and more particularly to traversing spatial hierarchies for ray tracing.

BACKGROUND

Ray tracing refers to a family of techniques for determining point-to-point visibility in a geometric scene, typically for the purpose of synthesizing an image. For example, an image of a virtual scene may be rendered by conceptually locating a virtual eyepoint and a virtual computer screen in the scene, then creating rays, called primary rays, from the eyepoint through every pixel of the screen. By computing the intersection of the primary rays with every object in the scene (e.g. tracing the rays), and selecting the first object intersected by every ray, the visible object at each pixel and color the pixel may be determined accordingly.

Computing this color, a process called shading, may involve tracing additional rays, called secondary rays. For example, shading may be utilized to determine the color of objects reflected in shiny objects (e.g. reflection rays) or to determine whether a point is in shadow by computing the visibility between a light source and a point being shaded (e.g. shadow rays). Shadow rays are a special case, since they only need to determine whether a ray segment intersects any object, and not which of multiple possible intersecting objects the ray intersects first.

In practice, ray tracing systems and techniques do not intersect every ray with every object in the scene. Instead, objects are organized into a spatial data structure, occasionally a grid, but most often a tree such as a bounding volume hierarchy (BVH) or a k-dimensional (k-d) tree. Each ray is then traversed through the tree by determining which tree nodes the ray intersects. Only objects contained by intersected nodes need to be tested for intersection with the ray.

Traversing a ray through a tree data structure, such as a BVH or k-d tree, involves recursively visiting one child of a node, then, if the ray does not hit anything in that child, visiting another child. Efficient implementations usually keep an explicit stack of "children not yet visited" in an iterative loop rather than use a recursive formulation. Either case presents a potential problem for implementation on parallel processing architectures such as graphics processing units (GPUs). In parallel processing architectures, each thread tracing a ray may keep a stack of variable and potentially unlimited size. Since modern GPUs process thousands of threads at once, this possibly incurs significant storage and bandwidth costs.

One prior art implementation, suggested a "stackless" traversal algorithm for k-d trees is called k-d restart. This approach avoids the need to keep a stack by continuously restarting traversal from the root. When a ray is intersected with primitive(s) in a leaf node, the ray either hits a primitive, in which case traversal is terminated, or it fails to hit any primitive, in which case the ray origin is advanced to the point where it exits the node, and traversal begins anew at the top of the tree for the new, shortened ray. Clearly, k-d restart requires much more work and higher memory bandwidth than straightforward k-d tree traversal, since nodes near the top of the tree will be fetched many times for a single ray.

Another prior art implementation independently realized that k-d tree traversal could be made "stackless" by using a "short stack." A short stack has stack semantics (e.g. pop, push) but only keeps a small, constant number k of entries. If more than k nodes are pushed on the stack, the oldest ones are simply discarded. An attempt to pop that would normally return a node which has been discarded initiates a k-d restart (advancing the ray origin and restarting traversal at the root node).

Unlike k-d tree nodes, nodes of some other spatial hierarchies (e.g. BVHs) may overlap, so there is no way to advance the ray until it exits this node without potentially advancing past some primitives in another node that the ray should have intersected. Without BVH restart, stackless or short stack BVH traversal may not be possible, forcing a full stack per thread, where a full stack typically requires one 32-bit pointer per level. The latency and bandwidth consumption from storing or spilling the stack into slow and/or off-chip memory destroys performance and makes BVH traversal uncompetitive on a parallel processing architecture such as a GPU.

There is thus a need for addressing these and/or other issues associated with the prior art.

SUMMARY

A system, method, and computer program product are provided for spatial hierarchy traversal. In operation, a spatial hierarchy is traversed for ray tracing. Additionally, a number of nodes traversed in each of a plurality of levels of the spatial hierarchy is stored.

DETAILED DESCRIPTION

Figure 1:
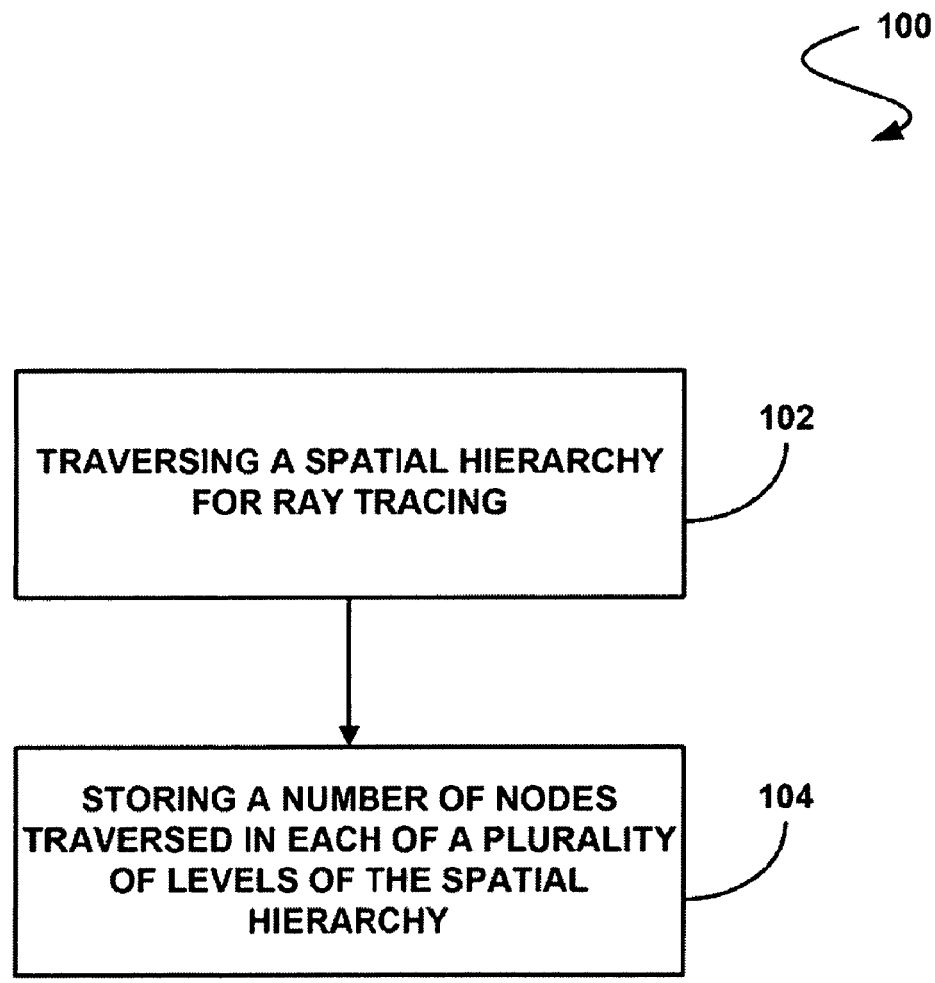
FIG. 1 shows a method for spatial hierarchy traversal, in accordance with one embodiment.

FIG. 1 shows a method 100 for spatial hierarchy traversal, in accordance with one embodiment. As shown, a spatial hierarchy is traversed for ray tracing. See operation 102. In the context of the present description, a spatial hierarchy refers to any hierarchical organization of volumes in space which may or may not overlap, whereby child nodes or descendents of child nodes are contained, at least in part, by at least one parent node. For example, in various embodiments, the spatial hierarchy may include, but is not limited to, a bounding volume hierarchy (BVH), a k-dimensional (k-d) tree, and/or any other spatial hierarchy that meets the above definition.

Additionally, in the context of the present description, traversal refers to any operation that includes traversing a data structure (e.g. a data tree) or representative data structure with a ray/segment or group of rays/segments, for determining one or more primitives (e.g., triangles, polygons, spheres, boxes, etc.) or groups containing primitives which intersect or nearly intersect the ray/segment.

As shown further, a number of nodes traversed in each of a plurality of levels of the spatial hierarchy is stored. See operation 104. As an option, the number of nodes traversed may be encoded. As another option, the number may be stored as one or more bits. For example, the number may be stored as a single bit. In either case, the number may optionally be utilized for the traversal. For example, the number may be utilized during the traversal.

Furthermore, in one embodiment, the traversal may be performed utilizing a stack. In the context of the present description, a stack refers to any data structure that utilizes a last-in first-out (LIFO) technique for storing and accessing data included in the data structure. As an option, the stack may include information on a small, fixed number of nodes (e.g. a short stack). In the context of the present description, a short stack refers to a stack which includes space for fewer nodes than a full or traditional stack. For example, in various embodiments, the short stack may include two or less nodes, three or less nodes, four or less nodes, five or less nodes, etc. Of course, the short stack may include any fixed number of nodes that is less than a larger traditional stack. As another option, the traversal may be performed utilizing a data structure which is not a stack.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
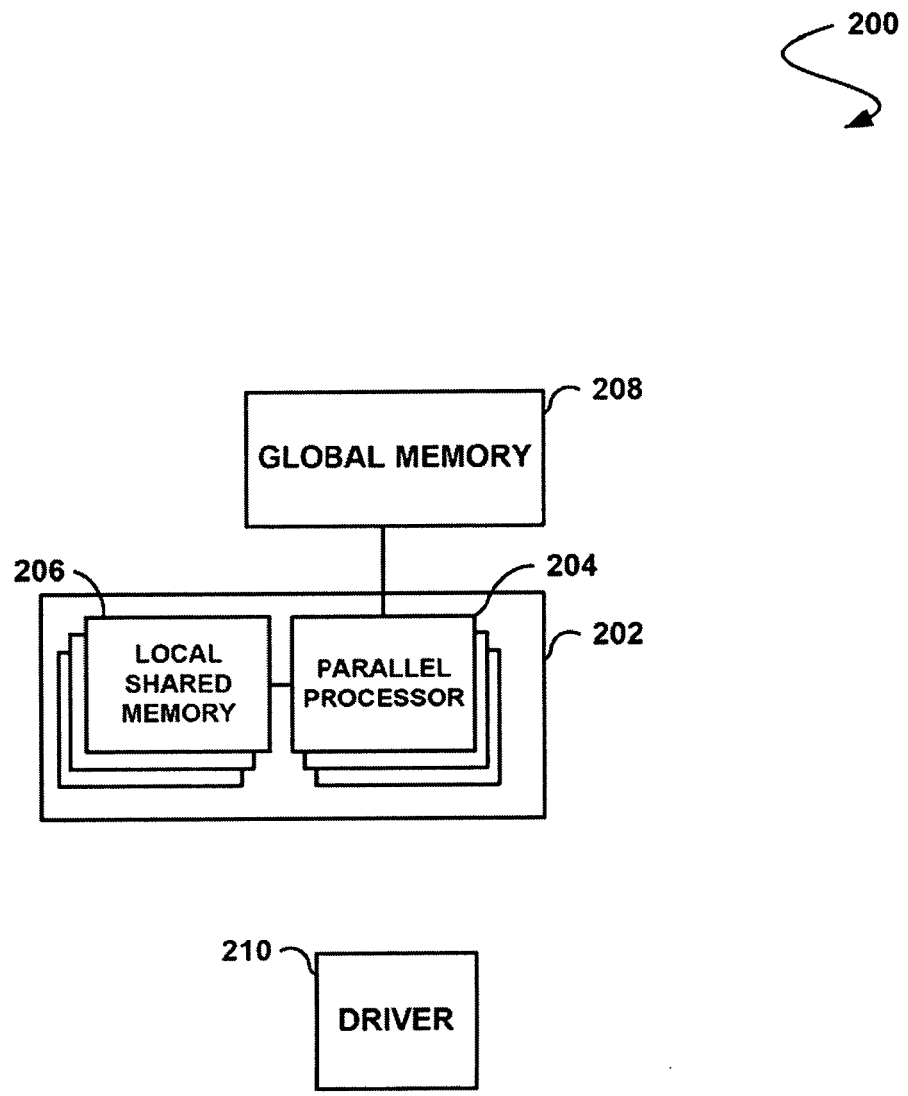
FIG. 2 shows a system for memory efficient spatial hierarchy traversal, in accordance with one embodiment.

FIG. 2 shows a system 200 for memory efficient spatial hierarchy traversal, in accordance with one embodiment. As an option, the present system may be implemented to carry out the method of FIG. 1. Of course, however, the present system may be implemented in any desired environment. It should also be noted that the aforementioned definitions may apply during the present description.

As shown, a parallel processing architecture 202 is provided. Such parallel processing architecture includes a plurality of parallel processors 204. While not shown, such parallel processors may be capable of operating on a predetermined number of threads. To this end, each of the parallel processors may operate in parallel, while the corresponding threads may also operate in parallel.

In one embodiment, the parallel processing architecture may include one or more single instruction multiple data (SIMD) processing elements. In such a system, the threads being executed by the processor are collected into groups such that at any instant in time all threads within a single group are executing precisely the same instruction but on potentially different data. In one embodiment, this group of threads operating in such fashion may be referred to as a "warp." Further, the predetermined number of threads in such a group may be referred to as the "warp size" of the corresponding processor.

In another embodiment, the foregoing parallel processing architecture may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture may include local shared memory 206. Each of the parallel processors of the parallel processing architecture may read and/or write to its own local shared memory. This shared memory may consist of physically separate memories associated with each processor or it may consist of separately allocated regions of one or more memories shared amongst the processors. Further, in the illustrated embodiment, the shared memory may be embodied on an integrated circuit on which the processors of the parallel processing architecture are embodied.

Still yet, global memory 208 is shown to be included. In use, such global memory is accessible to all the processors of the parallel processing architecture. As shown, such global memory may be embodied on an integrated circuit that is separate from the integrated circuit on which the processors of the aforementioned parallel processing architecture are embodied. While the parallel processing architecture is shown to be embodied on the various integrated circuits of FIG. 2 in a specific manner, it should be noted that the system components may or may not be embodied on the same integrated circuit, as desired.

Still yet, the present system of FIG. 2 may further include a driver 210 for controlling the parallel processing architecture, as desired. In one embodiment, the driver may include a library, for facilitating such control. For example, such library may include a library call that may instantiate the functionality set forth herein.

Further, in another embodiment, the driver may be capable of providing general computational capabilities utilizing the parallel processing architecture (e.g. a graphics processor, etc.). An example of such a driver may be provided in conjunction with the CUDA™ framework provided by NVIDIA Corporation. In use, the driver may be used to control an operation in accordance with the method of FIG. 1.

Figure 3:
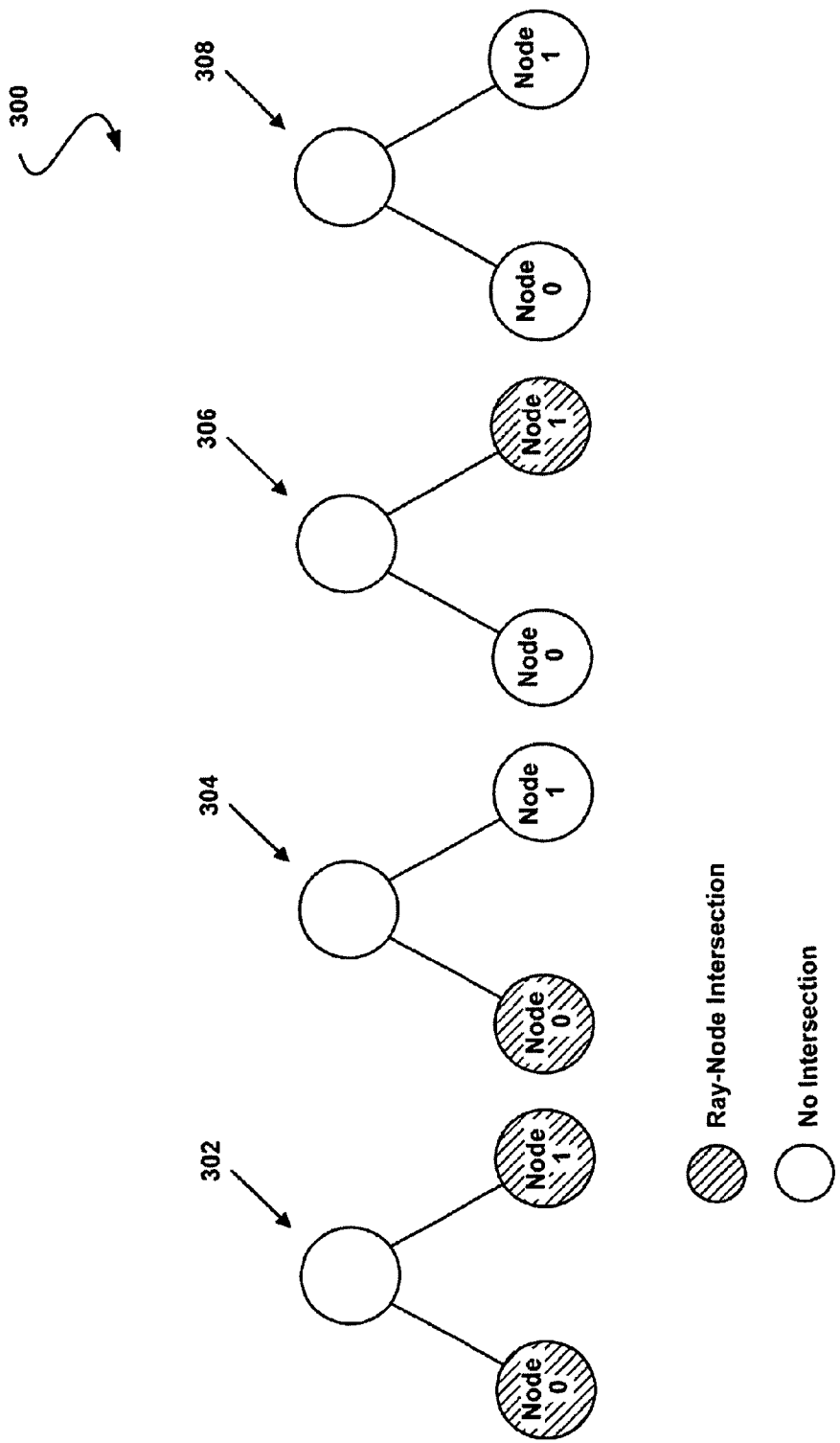
FIG. 3 shows a technique illustrating a memory efficient traversal of a spatial hierarchy, in accordance with one embodiment.

FIG. 3 shows a technique 300 illustrating a memory efficient traversal of a spatial hierarchy, in accordance with one embodiment. As an option, the present technique 300 may be implemented in the context of the functionality and architecture of FIGS. 1-2. Of course, however, the technique 300 may be carried out in any desired environment. Again, the aforementioned definitions may apply during the present description.

As shown, each spatial hierarchy (e.g. a BVH, etc.) node has two child nodes (child 0, child 1). As shown further, there are four possible cases during a traversal process. In the first case 302, a ray may intersect child 0 and child 1, as part of the traversal. In the second case 304, a ray may only intersect child 0, as part of the traversal. In the third case 306, a ray may only intersect child 1. In the fourth case 308, a ray may miss both child 0 and child 1, as part of the traversal process.

In the first case 302, the traversal proceeds first to the "first child." In the context of the present description, the "first child" refers to the child node that is to be examined first. For example, in one embodiment, the first child may be a child node which is closer to the origin of the ray. Furthermore, a "second child" is pushed into the stack for later traversal, where the "second child" refers to a child node that is to be examined after the first child. In the second case 304 and the third case 306, the traversal continues to the respective child node, and no stack manipulation is needed. In the fourth case 308, the traversal of the current branch terminates. In this case, a stack may be popped, or read, to find the next unvisited node.

Since the ray vs. node intersection tests determine which of the two child nodes should be processed first, the only information that actually needs to be stored in the stack is information indicating whether the "first node" has been processed. If this information is available, the traversal may be restarted from the root node. During re-traversal, or after the restart, the ray vs. node intersection tests may be performed as usual, and a corresponding stack entry may be consulted when the next step in traversal is in doubt (e.g. see the first case 302). As an option, the corresponding stack entry may be a 1-bit entry.

In one embodiment, the stack may be represented in a single 32-bit register or a 64-bit register. Because restarting from the root node is possible, a short stack may be used in conjunction with a BVH. In the context of the present description, a short stack refers to any stack that has a small, constant number k of entries (e.g. k=3, 4, etc.). Using the short stack allows efficient BVH traversal without using a significant amount of memory for the stack.

For ray-casting to be efficient, a maximum possible length of the ray should be tracked. Whenever the ray hits a primitive, a variable "tClosestHit" may be updated to contain the value of a ray parameter "t" at the hit point. It should be noted that in the special case of "shadow rays," updating "tClosestHit" may be irrelevant because intersection results are immediately returned upon hitting a primitive.

By updating the variable "tClosestHit," traversing nodes that are further away than the hit point may be avoided. However, in this way, the results of the ray vs. node intersection tests may be different when a restart is issued. Specifically, in a node where the ray intersected two children, the ray may intersect only one child or no children after the restart.

In one embodiment, effects of the variable "tClosestHit" may be ignored when choosing which of the cases 302-308 to take. In this case, a node may be pushed into the short stack when entering a two-child node where the "second child" is culled, resulting in a slightly larger number of short stack underflows and, consequently, restarts. In another embodiment, a bit may be pushed into the stack, regardless of which of the first, second and third cases 302-306 are encountered. Thus, a stack pointer (e.g. for tracking the number of elements in stack) may be updated for all results of the intersection tests to ensure the number of elements in the stack are tracked accurately.

Table 1 shows pseudocode that demonstrates the use of a single 32-bit register for storing a 1-bit-per-level stack. In this case, the stack is initialized with its highest bit as one, so that the termination of the algorithm may be detected from this bit overflowing to zero.

TABLE 1

```
main( )
{
  // init stack
  unsigned int stack = (1u<<31);
  unsigned int stackPtr = (1u<<31);
  float tClosestHit = 1.f; // closest found intersection
  Node node = root;
  while (1)
  {
    while(node.isInner( ))
    {
      Node child0 = node.child0;
      Node child1 = node.child1;
      // intersect child nodes, get NaN if no hit
      float tminChild0 = getClosestIntersection(ray,child0);
      float tminChild1 = getClosestIntersection(ray,child1);
      // ignore child nodes farther than current closest hit point
```

TABLE 1-continued

```
      if(tminChild0 > tClosestHit) tminChild0 = NaN;
      if(tminChild1 > tClosestHit) tminChild1 = NaN;
      // Case 1: Ray intersects both child nodes
      if(!isNaN(tminChild0) && !isNaN(tminChild1))
      {
        // Ensure child0 is near (first), child1 is far (second)
        if(tminChild1 < tminChild0)
        {
          swap(child0,child1);
        }
        // If this is the first time in this node, stack contains 0.
        // Otherwise, stack contains 1. In any case, the
        // stack pointer is advanced.
        stackPtr >>= 1; // advance stack ptr
        // Check stack: if this is the second time we visit this node,
        //go to far child.
        if(stack & stackPtr)
        {
          node = child1;
        }
        // Otherwise go to near child and push far child to short stack
        else
        {
          node = child0;
          shortstack.push(child1);
        }
      }
      // Case 2: Ray intersects only child0
      else if(!isNaN(tminChild0))
      {
        stackPtr >>= 1; // advance stack ptr
        stack |= stackPtr; // push 1 into stack
        node = child0;
      }
      // Case 3: Ray intersects only child1
      else if(!isNaN(tminChild1))
      {
        stackPtr >>= 1; // advance stack ptr
        stack |= stackPtr; // push 1 into stack
        node = child1;
      }
      // Case 4: Ray misses both children
      else
      {
        popStack( ); // explained below
      }
    }
    // at a leaf node
    intersect ray vs. primitives in the node
    tClosestHit = closest found ray-primitive intersection
    // Possible optimization: purge short stack when primitive is hit.
    if (primitive was hit)
      clearStack( ); // force restart at root
    popStack( );
  }
}
popStack( )
{
  // Clear lower bits of the stack register. This is needed when a 1-
  // or 2-child case has degenerated into zero children because of
  // updated tClosestHit. In this case, there may be ones in the stack
  // below the stack pointer, leading to possible issues.
  stack &= -stackPtr; // clears all bits below stack pointer
  // Update stack to reflect that the current branch has been
  // traversed. In this case, all lowest 1 bits are converted to 0, and
  // the first 0 bit to 1. Conveniently, an addition performs exactly
  // this.
  stack += stackPtr;
  // stack got empty?
  if (stack == 0)
    terminateTraversal( ); // return the closest intersection found
  // try to pop from short stack
  if (shortstack is empty)
  {
    // initiate restart from root
    node = root;
    stackPtr = (1u<<31);
  }
  else
  {
```

TABLE 1-continued

```
    node = shortstack.pop( );
    // The bit magic below finds the lowest 1 bit in the stack, and
    // sets the stack pointer to point to it.
    // Alternatively, one can store the stack pointer in the short
    // stack. It is also possible to store the stack pointers in the
    // Node structs at construction time, and fetch them along with the
    // rest of node data.
    unsigned int temp = stack>>1;
    stackPtr = (((temp-1) ^ temp) + 1);
  }
}
```

Figure 4:
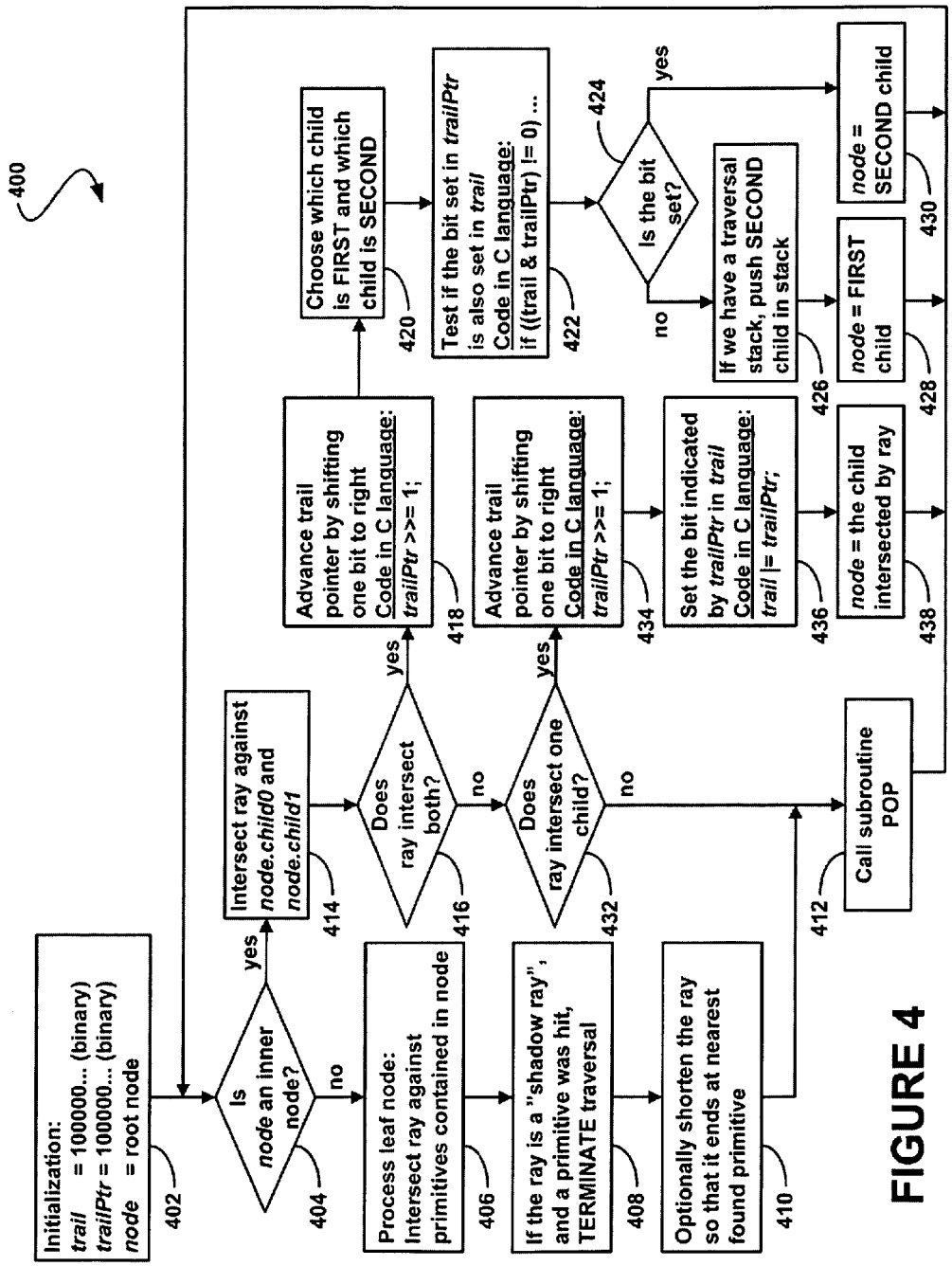
FIG. 4 shows a method for memory efficient spatial hierarchy traversal, in accordance with another embodiment.

FIG. 4 shows a method 400 for memory efficient spatial hierarchy traversal, in accordance with another embodiment. As an option, the present method 400 may be implemented in the context of the functionality and architecture of FIGS. 1-3. Of course, however, the method 400 may be carried out in any desired environment. Further, the aforementioned definitions may apply during the present description.

As shown, a routine is initialized by defining a data structure "trail," a data structure "trailPtr," and setting a current node equal to a root node. See operation 402. It is then determined whether a node is an inner node. See operation 404. If the node is not an inner node, a ray is intersected against primitives contained in the node. See operation 406.

If the ray is a "shadow ray," and a primitive was hit as a result of operation 406, the traversal is terminated. See operation 408. The ray is then optionally shortened so that the ray ends at the nearest primitive found. See operation 410. A "POP" subroutine is then called. See operation 412. One implementation of such subroutine will be explained in the context of the details of FIG. 5 below.

If in operation 404 it is determined that the node is an inner node, the ray is intersected against two child nodes of the node (e.g. child 0 and child 1). See operation 414. It is then determined which child nodes the ray intersects. See operations 416 and 432. If it is determined that the ray intersects both child nodes, "trailPtr" is advanced by shifting one bit to the right. See operation 418. It is then chosen which child is the first child and which child is second child. See operation 420. It is then determined if the bit set in "trailPtr" is also set in "trail." See operations 422 and 424.

If it is determined that the bit is not set, the second child in the stack is pushed in the case that a traversal stack is being utilized. See operation 426. The current node is then set to the first child node. See operation 428. If in operation 424 it is determined that the bit set in "trailPtr" is also set in "trail," the current node is then set to the second child node. See operation 430.

If it is determined that the ray intersects one child node in operation 432, "trailPtr" is advanced by shifting one bit to the right. See operation 434. The bit indicated by "trailPtr" is then set in "trail." See operation 436. The current node is then set to the child node intersected by the ray. See operation 438. If it is determined that the ray does not intersect child nodes in operations 416 and 432, the "POP" subroutine is called.

Figure 5:
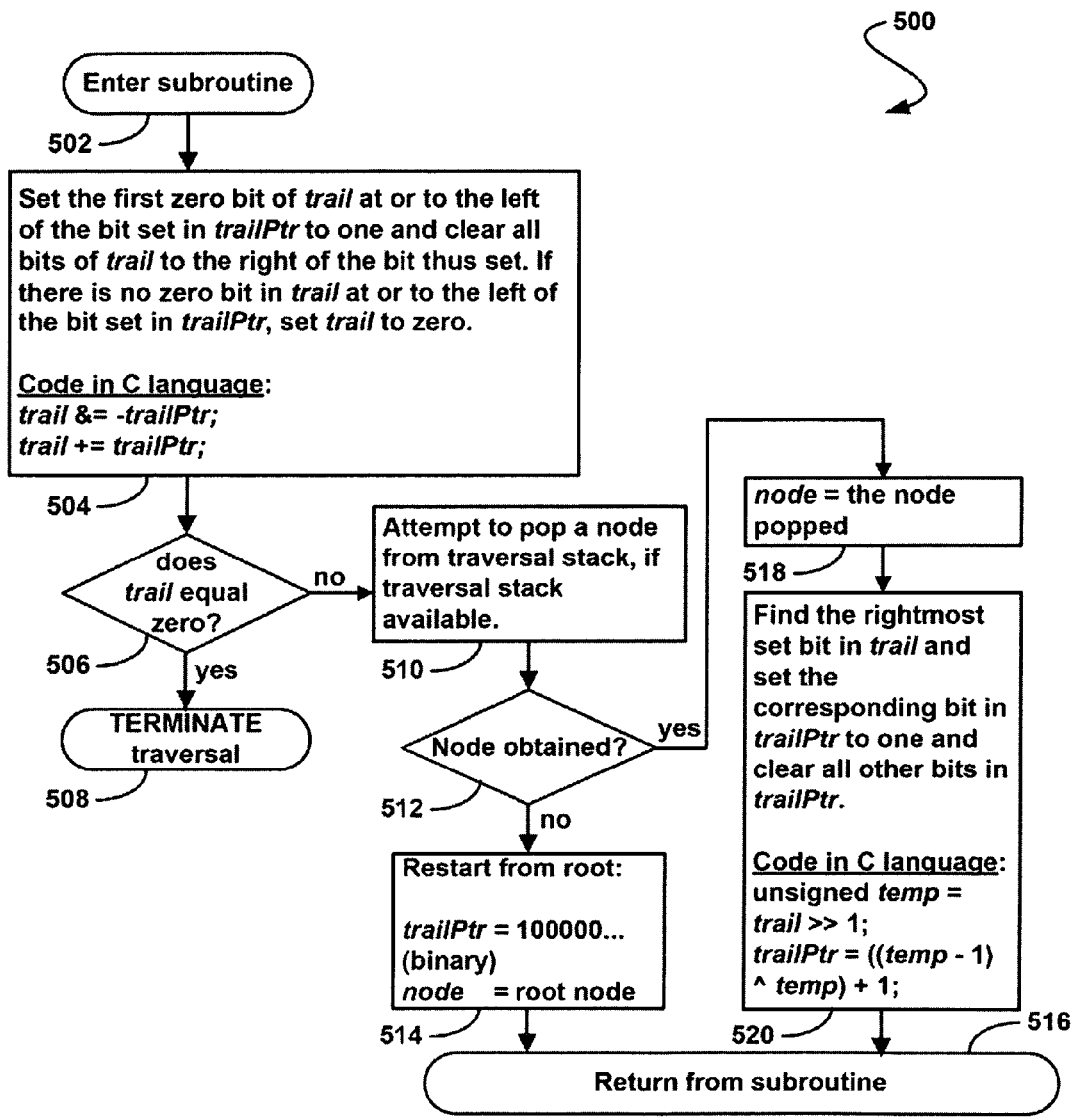
FIG. 5 shows a method for implementing a subroutine of the method of FIG. 4, in accordance with one embodiment.

FIG. 5 shows a method 500 for implementing the subroutine of the method 400 of FIG. 4, in accordance with one embodiment. As shown, the subroutine is called and entered. See operation 502. A first zero bit of "trail" at or to the left of the bit set in "trailPtr" is then set to one and all bits of "trail" to the right of the bit set are cleared. If there is no zero bit in "trail" at or to the left of the bit set in "trailPtr," "trail" is set to zero. See operation 504.

It is then determined whether "trail" is equal to zero. See operation 506. If "trail" does equal zero, the traversal is terminated. See operation 508. If "trail" does not equal zero, an attempt is made to pop a node from the traversal stack, in the case that a traversal stack is available. See operation 510.

It is then determined whether a node was obtained. See operation 512. If a node was not obtained, then the process restarts from the root node and the subroutine is exited. See operations 514 and 516.

If it is determined that a node is obtained in operation 512, the current node is set equal to the node popped. See operation 518. The rightmost set bit in "trail" is then found, the corresponding bit in "trailPtr" is set to one, and all other bits in "trailPtr" are cleared. See operation 520. The subroutine is then exited. See operation 516.

In one embodiment, the operation 520 may be omitted. For example, the operation 520 may be omitted if "trailPtr" is stored in the traversal stack along with node pointers. In this case, "trailPtr" may be read from the traversal stack.

As another example, the operation 520 may be omitted by storing "trailPtr" in each node of the hierarchy. For instance, "trailPtr" may be read from the hierarchy in the beginning of each traversal step (e.g. in operation 404 of FIG. 4). Alternatively, the level of the node may also be stored in each node of the hierarchy since "trailPtr" may be derived from a level of the node in the hierarchy.

With reference to FIGS. 4 and 5, it should be noted that all code illustrated in the operations are exemplary implementations only. There are various ways of implementing the described functionality and such code should not be construed as limiting in any manner. Furthermore, in various implementations of the methods 400 and 500, "trail" may or may not be a stack.

In the context of the methods 400 and 500 of FIGS. 4 and 5, "trail" may be any data structure that is updated so that it directs the traversal to the next untraversed node (where "next" is determined by the traversal order chosen) whenever a restart is issued for any reason. In this case, "trail" may be viewed as any data structure that is managed during the traversal so that, upon restart of a traversal process, the data structure enables the traversal to avoid entering the branches of the hierarchy that have already been completely traversed, causing the traversal to ultimately continue at the next untraversed node. In this case, the data structure may indicate the number of nodes traversed and may be utilized to determine the next node to traverse.

It should also be noted that, such data structure (e.g. "trail") is not limited to containing a fixed amount of data per level. For example, if a ray is never shortened, the updating of "trail" and "trailPtr" may be skipped whenever an inner node has only one child intersecting the ray. In this case, nothing may be stored for these types of nodes. In one embodiment, this technique may be implemented for "shadow rays," where shortening the ray is never done because any intersecting primitive immediately terminates the entire traversal.

Figure 6:
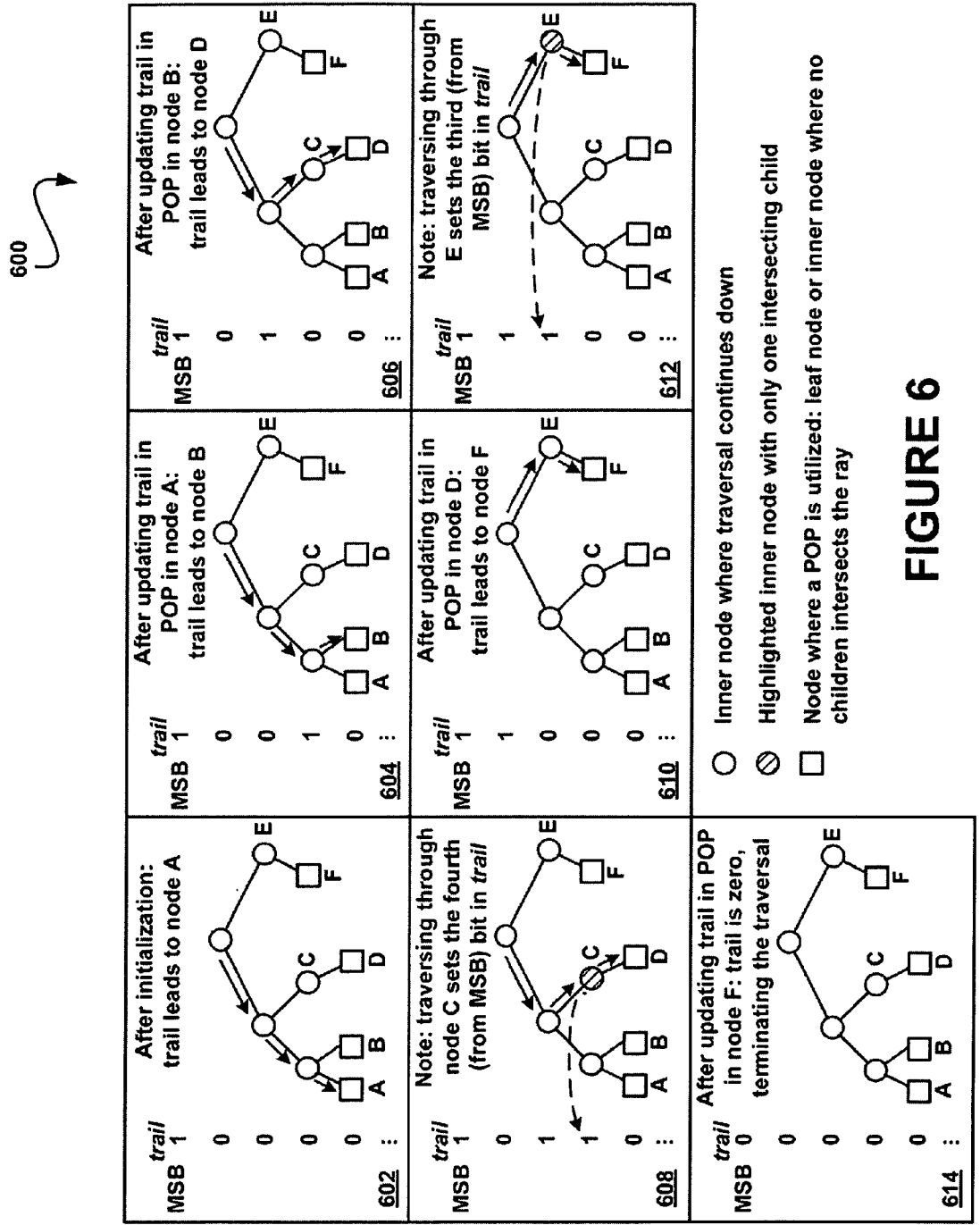
FIG. 6 shows a data structure traversal technique, in accordance with another embodiment.

FIG. 6 shows a data structure traversal technique 600, in accordance with another embodiment. As an option, the present technique 600 may be implemented in the context of the functionality and architecture of FIGS. 1-5. Of course, however, the technique 600 may be carried out in any desired environment. Further, the aforementioned definitions may apply during the present description.

As shown, the technique of traversal 600 illustrates how the restart trail always leads to the leaf node that should be processed next. Therefore, should a restart be issued at any point of traversal, the traversal continues beginning at the correct branch of a spatial hierarchy.

After initialization, the "trail" data structure leads to a first node A. See operation 602. After updating "trail" in the "POP" subroutine in node A, "trail" leads to a second node B. See operation 604. After updating in the "POP" subroutine in node B, "trail" leads to a third node D. See operation 606. In this case, traversing through node C to node D sets the fourth bit in "trail." See operation 608.

After updating "trail" in the "POP" subroutine in node D, "trail" leads to a fourth node F. See operation 610. In this case, traversing through node E to node F sets the third bit in "trail." See operation 612. After updating "trail" in the "POP" subroutine in node F, the traversal is terminated. See operation 614.

Figure 7:
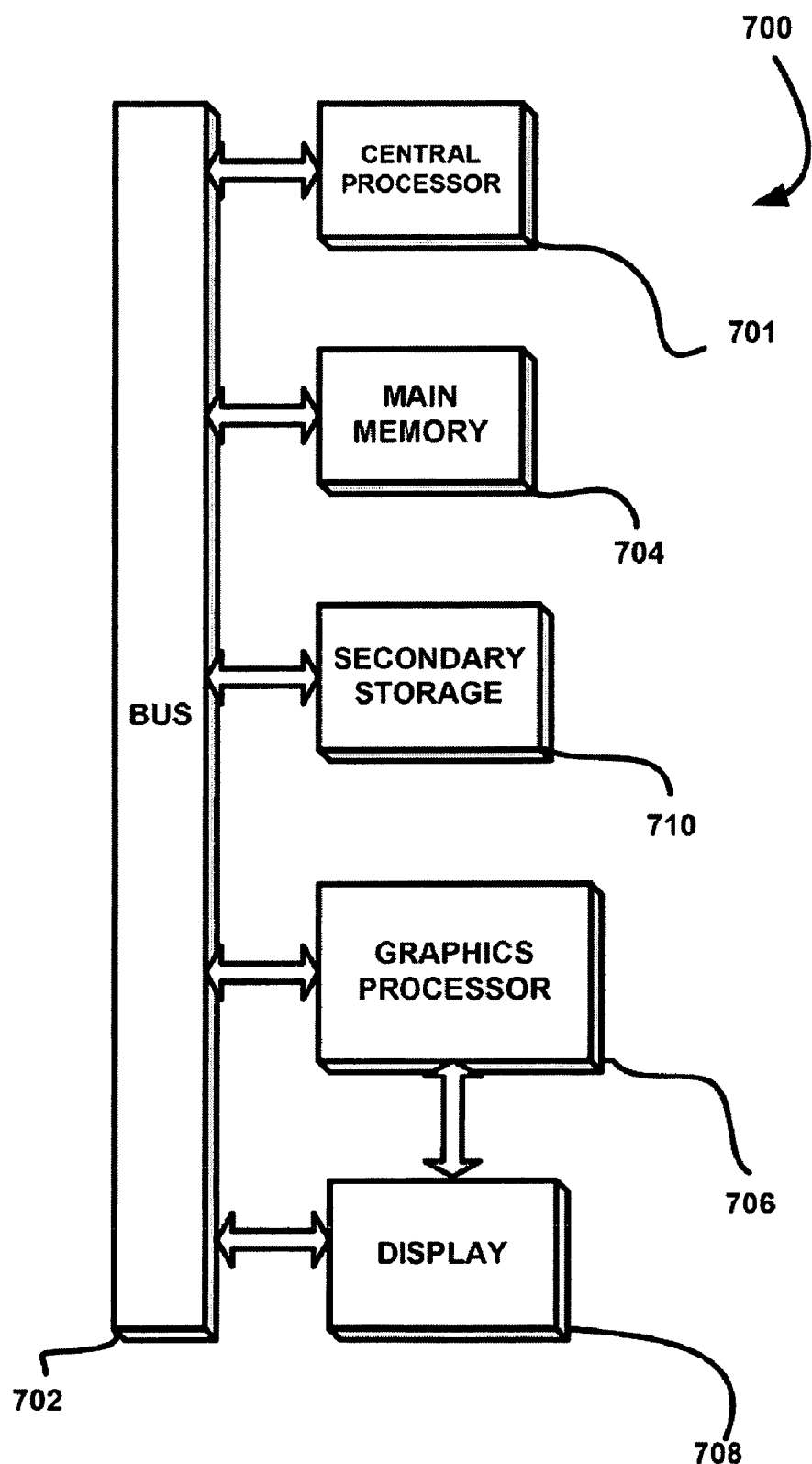
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices including, but not limited to, a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    initializing a first stack of bits to include only one bit per level of a spatial hierarchy, the first stack of bits initialized such that a most significant bit of the first stack of bits is set to a first value and all other bits of the first stack of bits are set to a second value;
    traversing, utilizing a processor, the spatial hierarchy for tracing a ray;
    storing, in the first stack of bits, a number of nodes traversed in each of a plurality of levels of the spatial hierarchy;
    setting the most significant bit of the first stack of bits to the second value as a result of storing, in the first stack of bits, the number of nodes traversed in each of the plurality of levels of the spatial hierarchy;
    detecting that the most significant bit of the first stack of bits is set to the second value; and
    terminating the traversal of the spatial hierarchy in response to the detection of the most significant bit of the first stack of bits being set to the second value;
    wherein the number of nodes traversed in each of the plurality of levels of the spatial hierarchy is stored regardless of whether the nodes are intersected by a ray.

2. The method of claim 1, wherein the spatial hierarchy includes a bounding volume hierarchy.

3. The method of claim 1, wherein the spatial hierarchy includes a k-dimensional (k-d) tree.

4. The method of claim 1, wherein the number is encoded.

5. The method of claim 1, wherein the first stack of bits includes information on a fixed number or less nodes.

6. The method of claim 1, wherein the number is utilized during the traversal.

7. The method of claim 1, wherein the first stack of bits is utilized to determine a node to traverse.

8. The method of claim 1, wherein the first stack of bits is utilized to determine a previously traversed branch in the spatial hierarchy.

9. The method of claim 1, wherein the managing of the first stack of bits includes shifting bits in the first stack of bits.

10. The method of claim 1, wherein the bits of the first stack of bits are conditionally shifted based on a number of nodes intersected by the ray.

11. The method of claim 1, wherein the first value is one and the second value is zero.

12. The method of claim 1, wherein the traversing of the spatial hierarchy for tracing the ray includes:
    popping a node of the spatial hierarchy from a traversal stack;
    identifying a rightmost bit set to the first value in the first stack of bits, and setting a corresponding bit in a same position in a second stack of bits to the first value and setting all other bits in the second stack of bits to the second value;
    determining that the popped node is an inner node;

determining that the ray intersects both a first child and a second child of the popped node; and advancing the second stack of bits by shifting the second stack of bits one bit right.

13. The method of claim 1, wherein the traversal is carried out utilizing a parallel processing architecture.

14. The method of claim 13, wherein the parallel processing architecture includes a graphics processor.

15. The method of claim 1, wherein a maximum possible length of the ray is tracked such that whenever the ray hits a primitive, a variable is updated to contain a value of a ray parameter at a point where the ray hit the primitive.

16. The method of claim 15, wherein by updating the variable, traversing nodes that are further away than the hit point is avoided.

17. The method of claim 1, wherein the first stack of bits is updated to direct the traversal of the spatial hierarchy to a next untraversed node whenever a restart is issued, and causes the traversal to continue at the next untraversed node.

18. The method of claim 17, wherein the updating of the first stack of bits is skipped when an inner node of the spatial hierarchy has only a single child intersecting the ray.

19. A computer program product embodied on a non-transitory computer readable medium, comprising:

computer code for initializing a first stack of bits to include only one bit per level of a spatial hierarchy, the first stack of bits initialized such that a most significant bit of the first stack of bits is set to a first value and all other bits of the first stack of bits are set to a second value;

computer code for traversing the spatial hierarchy for tracing a ray;

computer code for storing, in the first stack of bits, a number of nodes traversed in each of a plurality of levels of the spatial hierarchy;

computer code for setting the most significant bit of the first stack of bits to the second value as a result of storing, in the first stack of bits, the number of nodes traversed in each of the plurality of levels of the spatial hierarchy;

computer code for detecting that the most significant bit of the first stack of bits is set to the second value; and computer code for terminating the traversal of the spatial hierarchy in response to the detection of the most significant bit of the first stack of bits being set to the second value;

wherein the computer program product is operable such that the number of nodes traversed in each of the plurality of levels of the spatial hierarchy is stored regardless of whether the nodes are intersected by a ray.

20. An apparatus, comprising:

a processor for:

initializing a first stack of bits to include only one bit per level of a spatial hierarchy, the first stack of bits initialized such that a most significant bit of the first stack of bits is set to a first value and all other bits of the first stack of bits are set to a second value, traversing the spatial hierarchy for tracing a ray, detecting that the most significant bit of the first stack of bits is set to the second value, and terminating the traversal of the spatial hierarchy in response to the detection of the most significant bit of the first stack of bits being set to the second value;

memory for storing, in the first stack of bits, a number of nodes traversed in each of a plurality of levels of the spatial hierarchy, and setting the most significant bit of the first stack of bits to the second value as a result of storing, in the first stack of bits, the number of nodes traversed in each of the plurality of levels of the spatial hierarchy;

wherein the apparatus is operable such that the number of nodes traversed in each of the plurality of levels of the spatial hierarchy is stored regardless of whether the nodes are intersected by a ray.

21. The apparatus of claim 20, wherein the processor remains in communication with the memory and a display via a bus.

* * * * *